United States Patent [19]

Kitahara et al.

[11] Patent Number: 5,847,026
[45] Date of Patent: Dec. 8, 1998

[54] RECORDING INK CONTAINING PIGMENT PARTICLES AND POLYVINYL PYRROLIDONE

[75] Inventors: Takeo Kitahara, Nagoya; Shunichi Higashiyama, Yokkaichi, both of Japan

[73] Assignee: Brother Kogyo Kabushiki Kaisha, Nagoya, Japan

[21] Appl. No.: 754,614

[22] Filed: Nov. 21, 1996

Related U.S. Application Data

[63] Continuation of Ser. No. 496,224, Jun. 28, 1995, abandoned.

[30] Foreign Application Priority Data

Jul. 5, 1994 [JP] Japan ...................................... 6-153269
Jul. 8, 1994 [JP] Japan ...................................... 6-156963

[51] Int. Cl.$^6$ ..................................................... C09D 11/10
[52] U.S. Cl. ........................... 523/161; 524/366; 524/368; 524/369; 524/370; 260/DIG. 38
[58] Field of Search ........................... 523/161; 106/20 D; 524/366, 369, 370, 368; 260/DIG. 38

[56] References Cited

U.S. PATENT DOCUMENTS

| | | | |
|---|---|---|---|
| 4,339,763 | 7/1982 | Kyser et al. | 347/71 |
| 5,016,028 | 5/1991 | Temple | 347/69 |
| 5,159,349 | 10/1992 | Endo et al. | 346/33 A |
| 5,172,133 | 12/1992 | Suga et al. | 346/1.1 |
| 5,538,549 | 7/1996 | Kato et al. | 706/20 C |
| 5,607,999 | 3/1997 | Shimizu et al. | 524/503 |

FOREIGN PATENT DOCUMENTS

| | | |
|---|---|---|
| 2-103274 | 4/1990 | Japan . |
| 4-85375 | 3/1992 | Japan . |
| 4-180973 | 6/1992 | Japan . |
| 4-189876 | 7/1992 | Japan . |
| 5-239390 | 9/1993 | Japan . |

*Primary Examiner*—Marion E. McCamish
*Assistant Examiner*—John J. Guarriello
*Attorney, Agent, or Firm*—Oliff & Berridge, PLC

[57] ABSTRACT

A recording ink which includes at least water, a pigment as a colorant, polyvinyl pyrrolidone as a water-soluble polymer, and a compound having a polyoxyethylene chain. The compound having a polyoxyethylene chain may be replaced by a compound having a fluorinated hydrocarbon group.

47 Claims, No Drawings

RECORDING INK CONTAINING PIGMENT PARTICLES AND POLYVINYL PYRROLIDONE

This is a Continuation of application Ser. No. 08/496,224 filed Jun. 28, 1995, now abandoned.

BACKGROUND OF THE INVENTION

1. Field of the Invention

The present invention relates to an aqueous recording ink which contains pigment particles dispersed in an aqueous medium.

2. Discussion of Related Art

Conventionally, an aqueous ink which includes pigment particles dispersed in an aqueous medium has been widely used for writing utensils, or used in an ink jet printer such that droplets of the ink are expelled or ejected from nozzles of a printing head of the printer.

The conventional aqueous ink mainly contains a pigment as a colorant, an aqueous medium, and a dispersant for dispersing particles of the pigment in the aqueous medium. The ink further includes a pH adjuster, a humectant and other additives, as needed.

The dispersant may be selected from water-soluble surface active agents and water-soluble polymers, as disclosed in JP-A-2-103274, JP-A-4-85375, JP-A-4-180973, U.S. Pat. No. 5,172,133, JP-A-4-189876, and JP-A-5-239390, for example. Among these publications, JP-A-4-85375 discloses use of polyvinyl pyrrolidone as a water-soluble polymer for the dispersant.

If the polyvinyl pyrrolidone as a water-soluble polymer is left in an aqueous solvent for a long period of time, the polymer will react with water molecules in the solvent, and the reacted water molecules will not function as free water. As a result, the polymer is hydrated, that is, polyvinyl pyrrolidone particles are combined with a part of the reacted water molecules, to produce agglomerates. Consequently, the known recording ink having pigment particles dispersed therein exhibits poor biological stability when it is stored for a long period of time.

SUMMARY OF THE INVENTION

It is therefore an object of the present invention to provide a recording ink which exhibits excellent long-term storage stability.

The above object may be accomplished according to a first aspect of the present invention, which provides a recording ink comprising at least water, a pigment as a colorant, polyvinyl pyrrolidone as a water-soluble polymer, and a compound having a polyoxyethylene chain.

The above object may also be accomplished according to a second aspect of the present invention, which provides a recording ink comprising at least water, a pigment as a colorant, polyvinyl pyrrolidone as a water-soluble polymer, and a compound having a fluorinated hydrocarbon group.

The recording ink as described above includes the compound having a polyoxyethylene chain or the compound having a fluorinated hydrocarbon group, which is dissolved or dispersed in water. In this condition, pigment particles which are surrounded by polyvinyl pyrrolidone are dispersed or scattered in the solution, and the polyvinyl pyrrolidone is prevented from hydration thereof, whereby otherwise possible agglomeration and sedimentation of the pigment particles are avoided. Thus, the present recording ink is prevented from solidifying over a long period of time, and permits ink jet printing of high-quality images with high resolution, without suffering from clogging of nozzles formed through an ink jetting device. Further, the recording ink of the present invention enables long-term storage of printed images, making use of high weather-fastness and water-fastness of the pigment.

The above-indicated compound having a polyoxyethylene chain may include $-(CH_2CH_2O)_n-$ where n is at least 2. This compound may be a surface active agent containing a polyoxyethylene group or polyethylene glycol group.

The above-indicated compound having a fluorinated hydrocarbon group may be a fluorine-containing surface active agent.

The recording ink according to the first and second aspects of the present invention may be advantageously used in an ink jet device for jetting the ink from nozzles of the device, so as to effecting printing on a recording medium.

DETAILED DESCRIPTION OF INVENTION

While one embodiment of the recording ink of the present invention will be described in detail, by way of example, the present invention is by no means limited to the details of the following description.

The recording ink uses a pigment as a colorant of the ink. The content of the pigment is generally 3–20% by weight, preferably, 5–15% by weight. The pigment may be selected from various inorganic and organic pigments used for coloring purposes.

The inorganic pigments include: yellow pigments, such as cadmium yellow, chrome yellow, strontium yellow, and yellow iron oxide; red pigments, such as minium, vermilion, red iron oxide, and cuprous oxide; violet pigments, such as cobalt violet; blue pigments, such as prussian blue; green pigments, such as emerald green, cobalt green, and chromium oxide; white pigments, such as titanium oxide, zinc flower, white lead, and lithopone; and black pigments, such as carbon black and graphite, for example.

The organic pigments include azo-, acridine-, phthalocyanine-, quinacridone-, anthraquinone-, indanthrene-, dioxadine-, indigo-, thioindigo-, perylene-, perynone-, and isoindolenine pigments.

The recording ink according to the present invention contains 1–10% by weight, preferably, 2–5% by weight of polyvinyl pyrrolidone. The polyvinyl pyrrolidone desirably has an average molecular weight of about 2,000–400,000, and, more specifically, may be selected from those having the K-value of 12, 15, 17, 25, 30, 60, 80, 90, available from ISP Japan Ltd., Japan, and BASF Japan, Ltd.

The main solvent for the recording ink of the present embodiment is required to have a relatively low viscosity, and be treated or handled with safely and ease. Further, the solvent should be available at a low cost, and free from odor. To this end, the solvent may consist principally of water, preferably, distilled water or deionized water. The solvent may further include as needed an evaporation inhibitor, viscosity adjuster, surface tension adjuster, and a pH adjuster, for example. The present recording ink contains 50–95% by weight, preferably, 70–85% by weight of water, 0.1–40% by weight, preferably, 1–20% by weight of the evaporation inhibitor and viscosity adjuster, 0.1–20% by weight, preferably, 0.5–10% by weight of the surface tension adjuster, and 0.01–10% by weight, preferably, 0.1–5% by weight of the pH adjuster.

More specifically, the evaporation inhibitor and viscosity adjuster may be selected from: polyhydric alcohols, such as ethylene glycol, diethylene glycol, triethylene glycol, polyethylene glycol, propylene glycol, dipropylene glycol, polypropylene glycol, glycerol, 1, 2, 6-hexanetriol, and hexylene glycol; polyhydric alcohol alkyl ethers, such as ethylene glycol monomethyl ether, ethylene glycol monoethyl ether, ethylene glycol monobutyl ether, ethylene glycol monoallyl ether, diethylene glycol monomethyl ether, diethylene glycol monoethyl ether, diethylene glycol monobutyl ether, propylene glycol monomethyl ether, dipropylene glycol monomethyl ether, and tripropylene glycol monomethyl ether; polyhydric alcohol aryl ethers, such as ethylene glycol monophenyl ether, and ethylene glycol monobenzyl ether, for example.

The surface tension adjuster may be selected from polyhydric alcohol alkyl ethers, such as ethylene glycol monomethyl ether, ethylene glycol monoethyl ether, ethylene glycol monobutyl ether, ethylene glycol monoallyl ether, diethylene glycol monomethyl ether, diethylene glycol monoethyl ether, diethylene glycol monobutyl ether, propylene glycol monomethyl ether, dipropylene glycol monomethyl ether, and tripropylene glycol monomethyl ether; polyhydric alcohol aryl ethers, such as ethylene glycol monophenyl ether, and ethylene glycol monobenzyl ether; and lower alcohols, such as ethanol and 2-propanol, for example.

The pH adjuster may be selected from organic amines, such as monoethyl amine, diethyl amine and triethyl amine, alkanol amines, such as diethanol amine and triethanol amine, hydroxides of alkali metal elements, such as sodium hydroxide and potassium hydroxide, carbonates of alkali metal elements, such as sodium carbonate and potassium carbonate, ammonium hydroxide, quaternary ammonium salts and others.

The recording ink of the present embodiment includes a compound having a polyoxyethylene chain. The content of this compound is 0.01–10% by weight, preferably, 0.5–5% by weight. The compound includes $-(CH_2CH_2O)_n-$ group, where n is 2 or a larger number. For example, the compound may be a surface active agent containing a polyoxyethylene group or polyethylene glycol group.

More specifically, the surface active agent containing a polyoxyethylene group may be selected from nonionic surface active agents including: polyoxyethylene alkyl ethers, such as polyoxyethylene lauryl ether, and polyoxyethylene oleyl ether; polyoxyethylene alkyl aryl ethers, such as polyoxyethylene octyl phenyl ether, and polyoxyethylene nonyl phenyl ether; polyoxyethylene polyoxypropylene alkyl ethers, such as polyoxyethylene polyoxypropylene lauryl ether; polyoxyethylene alkyl amines, such as polyoxyethylene lauryl amine, and polyoxyethylene stearyl amine; polyoxyethylene fatty acid alkanol amides, such as polyoxyethylene stearic acid amide; polyoxyethylene sorbitan fatty acid esters, such as polyoxyethylene sorbitan monolaurate, and polyoxyethylene sorbitan monooleate; and polyoxyethylene sorbitol fatty acid esters, such as polyoxyethylene sorbitol tetraoleate. The polyoxyethylene-containing surface active agents may also be selected from anionic surface agents including: polyoxyethylene alkyl ether sulfates, such as sodium polyoxyethylene alkyl ether sulfate; and polyoxyethylene alkyl aryl ether sulfates, such as sodium polyoxyethylene alkyl phenyl ether sulfate.

The surface active agents containing a polyethylene glycol group may be selected from nonionic surface active agents including polyethylene glycol fatty acid esters, such as polyethylene glycol monolaurate, and polyethylene glycol monostearate.

To produce the recording ink of the present embodiment, the pigment particles may be readily dispersed in a ball mill, sand mill, roller mill or ultrasonic homogenizer, for example.

The second embodiment of the recording ink of the present invention is different from the first embodiment as described above, only in that the recording ink contains a compound having a fluorinated hydrocarbon group, in place of the compound having a polyoxyethylene chain as used in the first embodiment. The content of the compound having a fluorinated hydrocarbon group is in a range of 0.001–5% by weight, preferably, 0.1–2% by weight.

The compound having a fluorinated hydrocarbon group, preferably, a fluorinated alkyl group, such as a perfluoroalkyl group, may be selected from fluorine-containing surface active agents, which include: nonionic surface active agents, such as a monoether of N-hydroxyalkyl perfluoroalkanesulfonamide with polyethylene glycol, perfluoroalkyl alkoxylate, and fluorinated alkyl ester; and anionic surface active agents, such as ammonium perfluoroalkyl sulfonate, and potassium perfluoroalkyl sulfonate, for example. The monoether of N-hydroxyalkyl perfluoroalkanesulfoneamide with polyethylene glycol may be N-ethyl-N-(2-polyoxyethylene-ethyl)-perfluorooctanesulfonamide, which is represented by $CF_3-(CF_2)_7-SO_2-N(CH_2CH_3)-CH_2-CH_2-(O\ CH_2CH_2)_n-OH$.

There will be described in detail four examples of the first embodiment of the present invention, corresponding four comparative examples, three examples of the second embodiment of the invention and corresponding three comparative examples.

EXAMPLE 1

| | |
|---|---|
| carbon black | 5% by weight |
| (MA-100 available from Mitsubishi Kasei Corporation, Japan) | |
| polyvinyl pyrrolidone | 4% by weight |
| (K-15 available from ISP Japan Ltd., Japan) | |
| polyoxyethylene nonyl phenyl ether | 2% by weight |
| (Emulgen 920 available from Kao Corporation, Japan) | |
| glycerol | 10% by weight |
| triethanol amine | 2% by weight |
| deionized water | balance |

A recording ink according to Example 1 was produced, using the above ingredients, in the following manner. Initially, deionized water, glycerol, triethanol amine, and polyoxyethylene nonyl phenyl ether were mixed together, and the resulting solution was then blended with polyvinyl pyrrolidone. Then, carbon black was added to the solution and finely dispersed, using a ball mill. The thus obtained mixture was then passed through a filter, for example, under an increased or reduced pressure, so as to remove foreign matter or dust as needed. In this manner, the recording ink of Example 1 was obtained.

Recording inks according to Examples 2–4 and Comparative Examples 1–4 were produced in a similar manner, using the following ingredients.

EXAMPLE 2

| | |
|---|---|
| carbon black | 5% by weight |
| (PRINTEX 90 available from Degussa Japan Co., Ltd., Japan) | |
| polyvinyl pyrrolidone | 2% by weight |
| (K-30 available from ISP Japan Ltd., Japan) | |
| polyoxyethylene sorbitan monolaurate | 2% by weight |
| (SORBON T-20 available from Toho Chemical Industry Co., Ltd., Japan) | |

| | |
|---|---|
| propylene glycol | 10% by weight |
| diethanol amine | 2% by weight |
| deionized water | balance |

EXAMPLE 3

| | |
|---|---|
| C.I. Pigment Yellow 12 | 3% by weight |
| (Permanent Yellow DHG available from Hoechst Japan Ltd. Japan) | |
| polyvinyl pyrrolidone | 2% by weight |
| (K-30 available from ISP Japan Ltd.) | |
| polyethylene glycol monostearate | 2% by weight |
| (EMANON 3199 available from Kao Corporation) | |
| ethylene glycol | 10% by weight |
| sodium carbonate | 2% by weight |
| deionized water | balance |

EXAMPLE 4

| | |
|---|---|
| C.I. Pigment Red 57:1 | 3% by weight |
| (Irgalite Rubine 4BL available from CIBA GEIGY Japan Ltd., Japan) | |
| polyvinyl pyrrolidone | 2% by weight |
| (K-30 available from ISP Japan Ltd.) | |
| polyoxyethylene alkyl ether sodium sulfate | 2% by weight |
| (LEVENOL WX available from Kao Corporation) | |
| ethylene glycol monomethyl ether | 10% by weight |
| ammonium hydroxide | 2% by weight |
| deionized water | balance |

COMPARATIVE EXAMPLE 1

A recording ink according to Comparative Example 1 was produced using all the ingredients used in Example 1 but polyoxyethylene nonyl phenyl ether.

COMPARATIVE EXAMPLE 2

A recording ink according to Comparative Example 2 was produced using all the ingredients used in Example 2 but polyoxyethylene sorbitan monolaurate.

COMPARATIVE EXAMPLE 3

A recording ink according to Comparative Example 3 was produced using all the ingredients used in Example 3 but polyoxyethylene glycol monostearate.

COMPARATIVE EXAMPLE 4

A recording ink according to Comparative Example 4 was produced using all the ingredients used in Example 4 but polyoxyethylene alkyl ether sodium sulfate.

EXAMPLE 5

| | |
|---|---|
| carbon black | 5% by weight |
| (MA-100 available from Mitsubishi Kasei Corporation) | |
| polyvinyl pyrrolidine | 4% by weight |
| (K-15 available from ISP Japan Ltd.) | |
| N-ethyl-N-(2-polyoxyethylene-ethyl)-perfluoro-octanesulfonamide | 1% by weight |
| (Fluorad FC-170C available from Sumitomo 3M Limited, Japan) | |
| glycerol | 10% by weight |
| triethanol amine | 2% by weight |
| deionized water | balance |

A recording ink according to Example 5 was produced, using the above ingredients, in the following manner. Initially, deionized water, glycerol, triethanol amine, and N-ethyl-N-(2-polyoxyethylene-ethyl)-perfluorooctanesulfonamide were mixed together, and the resulting solution was then blended with polyvinyl pyrrolidone. Then, carbon black was added to the solution and finely dispersed, using a ball mill. The thus obtained mixture was then passed through a filter, for example, under an increased or reduced pressure, so as to remove foreign matter or dust as needed. In this manner, the recording ink of Example 5 was obtained.

EXAMPLE 6

| | |
|---|---|
| carbon black | 5% by weight |
| (PRINTEX 90 available from Degussa Japan Co., Ltd.) | |
| polyvinyl pyrrolidone | 2% by weight |
| (K-30 available from ISP Japan Ltd.) | |
| alkyl ester fluoride | 1% by weight |
| (Fluorad FC-430 available from Sumitomo 3M Limited) | |
| propylene glycol | 10% by weight |
| diethanol amine | 2% by weight |
| deionized water | balance |

EXAMPLE 7

| | |
|---|---|
| carbon black | 5% by weight |
| (REGAL 250R available from KYABURAKKU K.K., Japan) polyvinyl pyrrolidone | 2% by weight |
| (K-30 available from ISP Japan Ltd.) | |
| potassium perfluoroalkyl sulfonate | 1% by weight |
| (Fluorad FC-129 available from Sumitomo 3M Limited) | |
| ethylene glycol | 10% by weight |
| ammonium hydroxide | 2% by weight |
| deionized water | balance |

COMPARATIVE EXAMPLE 5

A recording ink according to Comparative Example 5 was produced using all the ingredients used in Example 5 but N-ethyl-N-(2-polyoxyethylene-ethyl)-perfluorooctanesulfonamide.

COMPARATIVE EXAMPLE 6

A recording ink according to Comparative Example 6 was produced using all the ingredients used in Example 6 but fluorinated alkyl ester.

COMPARATIVE EXAMPLE 7

A recording ink according to Comparative Example 7 was produced using all the ingredients used in Example 7 but potassium perfluoroalkyl sulfonate.

The recording inks of the above examples and comparative examples were evaluated in the following manner. An ink specimen of each example was poured into a glass bottle, which was then fluid-tightly closed, and stored in a thermostat at respective temperatures of −20° C., 50° C. and 70° C. After the storage, the ink specimen was observed to determine the presence of agglomerated pigment particles, or sedimentation of the pigment particles, in the ink specimen. The results of the observation are indicated in TABLE 1 below, in which "O" indicates that no change was found in the ink. It will be understood from the table that the recording inks of Examples 1 through 7 were free from agglomeration and sedimentation of the pigment particles, after stored at any of the above temperatures of −20° C., 50° C. and 70° C., and thus exhibited excellent storage stability.

In the recording inks of Comparative Examples 1 and 2, sedimentation of the pigment particles was found after each ink was stored at −20° C., and agglomerated pigment particles were found after each ink was stored at 50° C. and 70° C. In the recording inks of Comparative Examples 3 and 4, agglomerated pigment particles were found after each ink was stored at −20° C., 50° C. and 70° C. In the recording inks of Comparative Examples 5–7, sedimentation of the pigment particles was found after each ink was stored at −20° C., and agglomerated pigment particles were found after each ink was stored at 50° C. and 70° C. Thus, the recording inks of Comparative Examples 1–7 underwent biological changes after stored at any of the above temperatures of −20° C., 50° C. and 70° C., and thus exhibited poor storage stability.

The above-described tests for determining the storage stability of each example were not conducted at an ordinary temperature or room temperature, since such a test will take a considerably long period of time. However, the storage stability of each ink at a room temperature may be estimated from the results of the above tests conducted at elevated temperatures of 50° C. and 70° C. As known in the art, these tests are generally called as accelerated tests. That is, the storage stability of each example at a room temperature, and at respective temperatures of −20° C., 50° C. and 70° C. can be evaluated by the above-described tests.

The recording ink of each of Examples 1–7 according to the present invention contained a compound having a polyoxyethylene chain, such as polyoxyethylene nonyl phenyl ether, or a compound having a fluorinated hydrocarbon group, such as perfluoroalkyl polyoxyethylene ethanol. With polyoxyethylene nonyl phenyl ether or perfluoroalkyl polyoxyethylene ethanol dissolved in water, the pigment particles surrounded by polyvinyl pyrrolidone were dispersed or scattered in the solvent, and the polyvinyl pyrrolidone was prevented from hydration. Accordingly, otherwise possible agglomeration and sedimentation of the pigment particles were avoided.

When the recording ink of each of Examples 1–7 was used in an ink jet printhead having shear mode actuators, as disclosed in U.S. Pat. No. 5,016,028, to effect ink jet printing, the ink was stably jetted or ejected from the printhead, without causing clogging of nozzles of the printhead, and rapidly dried on a recording medium after the printing. The present ink was also excellent in terms of the water-fastness, resistance to abrasion, and finger touch.

Similar effects were obtained when the recording ink as described above was used in other types of ink jet printheads, such as a Kyser type as disclosed in U.S. Pat. No. 4,339,763, or a thermal jet type as disclosed in U.S. Pat. No. 5,159,349.

TABLE 1

| | Stability after 2-month storage | | |
|---|---|---|---|
| | −20° C. | 50° C. | 70° C. |
| Example 1 | O | O | O |
| Example 2 | O | O | O |
| Example 3 | O | O | O |
| Example 4 | O | O | O |
| Example 5 | O | O | O |
| Example 6 | O | O | O |
| Example 7 | O | O | O |
| Comparative Example 1 | Sedimentation | Agglomeration | Agglomeration |
| Comparative Example 2 | Sedimentation | Agglomeration | Agglomeration |
| Comparative Example 3 | Agglomeration | Agglomeration | Agglomeration |
| Comparative Example 4 | Agglomeration | Agglomeration | Agglomeration |
| Comparative Example 5 | Sedimentation | Agglomeration | Agglomeration |
| Comparative Example 6 | Sedimentation | Agglomeration | Agglomeration |
| Comparative Example 7 | Sedimentation | Agglomeration | Agglomeration |

What is claimed is:

1. A recording ink comprising at least water, a pigment as a colorant, 2–5% by weight of polyvinyl pyrrolidone as a water-soluble polymer, and a surface active agent having a polyoxyethylene chain.

2. A recording ink according to claim 1, wherein said surface active agent having a polyoxyethylene chain includes $-(CH_2CH_2O)_n-$ where n is at least 2.

3. A recording ink according to claim 1, wherein said surface active agent having a polyoxyethylene chain is a surface active agent containing a polyoxyethylene group or a surface active agent containing a polyethylene glycol group.

4. A recording ink according to claim 3, wherein said surface active agent containing a polyoxyethylene group is selected from the group consisting of: polyoxyethylene alkyl ethers, polyoxyethylene alkyl aryl ethers, polyoxyethylene polyoxypropylene alkyl ethers, polyoxyethylene alkyl amines, polyoxyethylene fatty acid alkanol amides, polyoxyethylene sorbitan fatty acid esters, polyoxyethylene sorbitol fatty acid esters, polyoxyethylene alkyl ether sulfates, and polyoxyethylene alkyl aryl ether sulfates, and said surface active agent containing a polyethylene glycol group is selected from polyethylene glycol fatty acid esters.

5. A recording ink according to claim 1, which contains 50–95% by weight of said water, and 3–20% by weight of said pigment.

6. A recording ink according to claim 1, wherein said polyvinyl pyrrolidone has a K-value of 12–90.

7. A recording ink according to claim 2, wherein said surface active agent having a polyoxyethylene chain is a surface active agent containing a polyethylene glycol group.

8. A recording ink according to claim 1, which contains 0.01–10% by weight of said surface active agent having a polyoxyethylene chain.

9. A recording ink according to claim 4, wherein said polyethylene glycol fatty acid esters are selected from the group consisting of polyethylene glycol monolaurate and polyethylene glycol monostearate.

10. A recording ink according to claim 8, wherein the amount of surface active agent having a polyethylene chain is 0.5–5% by weight.

11. A recording ink comprising at least water, a pigment as a colorant, polyvinyl pyrrolidone as a water-soluble polymer, and a fluorine-containing nonionic or anionic surface active agent having a fluorinated hydrocarbon group.

12. A recording ink according to claim 11, wherein said fluorine-containing nonionic or anionic surface active agent is selected from the group consisting of: perfluoroalkyl polyoxyethylene ethanol, perfluoro alkyl alkoxylate, fluorinated alkyl ester, ammonium perfluoro alkyl sulfonate, and potassium perfluoroalkyl sulfonate.

13. A recording ink according to claim 11, wherein said polyvinyl pyrrolidone has a K-value of 12–90.

14. A recording ink according to claim 11, wherein the amount of polyvinyl pyrrolidone is 2–5% by weight.

15. A recording ink according to claim 11, which contains 0.001–5% by weight of said fluorine-containing nonionic or anionic surface active agent.

16. A recording ink according to claim 12, wherein the amount of polyvinyl pyrrolidone is 2–5% by weight.

17. A recording ink according to claim 15, wherein the amount of fluorine-containing nonionic or anionic surface active agent is 0.1–2% by weight.

18. A recording ink according to claim 14, which contains 50–95% by weight of said water, and 3–20% by weight of said pigment.

19. A recording ink comprising at least water, a pigment as a colorant, polyvinyl pyrrolidone as a water-soluble polymer, and a surface active agent having a polyoxyethylene chain, said surface active agent having a polyoxyethylene chain being a surface active agent containing a polyoxyethylene group, which is selected from the group consisting of polyoxyethylene alkyl aryl ethers, polyoxyethylene polyoxypropylene alkyl ethers, polyoxyethylene alkyl amines, polyoxyethylene fatty acid alkanol amides, polyoxyethylene sorbitol fatty acid esters, polyoxyethylene alkyl ether sulfates, and polyoxyethylene alkyl aryl ether sulfates.

20. A recording ink according to claim 19, which contains 2–5% by weight of said polyvinyl pyrrolidone.

21. A recording ink according to claim 19, which contains 0.01–10% by weight of said surface active agent containing a polyoxyethylene group.

22. A recording ink according to claim 21, wherein the amount of surface active agent containing a polyoxyethylene group is 0.5–5% by weight.

23. A recording ink according to claim 20, which contains 50–95% by weight of said water, and 3–20% by weight of said pigment.

24. A recording ink comprising at least water, a pigment as a colorant, polyvinyl pyrrolidone as a water-soluble polymer, and a surface active agent having a polyoxyethylene chain, said surface active agent having a polyoxyethylene chain being a surface active agent containing a polyethylene glycol group.

25. A recording ink according to claim 24, wherein said surface active agent containing a polyethylene glycol group is a nonionic surface active agent containing a polyethylene glycol group.

26. A recording ink according to claim 25, wherein said nonionic surface active agent containing a polyethylene glycol group is selected from polyethylene glycol fatty acid esters.

27. A recording ink according to claim 26, wherein said polyethylene glycol fatty acid esters are selected from the group consisting of polyethylene glycol monolaurate and polyethylene glycol monostearate.

28. A recording ink according to claim 24, which contains 2–5% by weight of said polyvinyl pyrrolidone.

29. A recording ink according to claim 28, which contains 50–95% by weight of said water, and 3–20% by weight of said pigment.

30. A recording ink according to claim 24, which contains 0.01–10% by weight of said surface active agent containing a polyethylene glycol group.

31. A recording ink according to claim 30, wherein the amount of surface active agent containing a polyethylene glycol group is 0.5–5% by weight.

32. A method of producing a recording ink comprising the steps of:
  preparing an aqueous solution containing a surface active agent having a polyoxyethylene chain;
  adding polyvinyl pyrrolidone as a water-soluble polymer to said aqueous solution; and
  dispersing a pigment as a colorant in said aqueous solution.

33. A method of producing a recording ink according to claim 32, wherein said step of preparing an aqueous solution comprises adding to water a surface active agent containing a polyoxyethylene group or a surface active agent containing a polyethylene glycol group.

34. A method of producing a recording ink according to claim 33, wherein said surface active agent containing a polyoxyethylene group is selected from the group consisting of polyoxyethylene alkyl ethers, polyoxyethylene alkyl aryl ethers, polyoxyethylene polyoxypropylene alkyl ethers, polyoxyethylene alkyl amines, polyoxyethylene fatty acid alkanol amides, polyoxyethylene sorbitan fatty acid esters, polyoxyethylene sorbitol fatty acid esters, polyoxyethylene alkyl ether sulfates, and polyoxyethylene alkyl aryl ether sulfates, and said surface active agent containing a polyethylene glycol group is a polyethylene glycol fatty acid ether.

35. A method of producing a recording ink according to claim 34, wherein said polyethylene glycol fatty acid ethers are selected from the group consisting of polyethylene glycol monolaurate and polyethylene glycol monostearate.

36. A method of producing a recording ink according to claim 32, wherein said polyvinyl pyrrolidone has a K-value of 12 to 90.

37. A method of producing a recording ink according to claim 32, wherein said recording ink contains 0.01–10% by weight of said surface active agent having a polyoxyethylene chain.

38. A method of producing a recording ink according to claim 32, wherein said recording ink contains 0.5–5% by weight of said surface active agent having a polyoxyethylene chain.

39. A method of producing a recording ink according to claim 32, wherein said recording ink contains 2–5% by weight of polyvinyl pyrrolidone.

40. A method of producing a recording ink according to claim 32, wherein said recording ink contains 50–90% by weight of water and 3–20% by weight of said pigment.

41. A method of producing a recording ink comprising the steps of:
  preparing an aqueous solution containing a fluorine-containing nonionic or anionic surface active agent having a fluorinated hydrocarbon group;
  adding polyvinyl pyrrolidone as a water-soluble polymer to said aqueous solution; and then
  dispersing a pigment as a colorant in said aqueous solution.

42. A method of producing a recording ink according to claim 41, wherein said fluorine-containing nonionic or anionic surface active agent is selected from the group consisting of perfluoroalkyl polyoxyethylene ethanol, perfluoro alkyl alkoxylate, fluorinated alkyl ester, ammoniom perfluoroaklyl sulfonate and potassium perfluoro alkyl sulfonate.

43. A method of producing a recording ink according to claim 41, wherein said polyvinyl pyrrolidone has a K-value of 12 to 90.

44. A method of producing a recording ink according to claim 41, wherein said recording ink contains 0.001–5% by weight of said fluorine-containing nonionic or anionic surface active agent.

45. A method of producing a recording ink according to claim 41, wherein said recording ink contains 0.1–2% by weight of said fluorine-containing nonionic or anionic surface active agent.

46. A method of producing a recording ink according to claim 41, wherein said recording ink contains 2–5% by weight of said polyvinyl pyrrolidone.

47. A method of producing a recording ink according to claim 41, wherein said recording ink contains 50–90% by weight of water and 3–20% by weight of said pigment.

* * * * *